Dec. 15, 1953  W. C. CHILDRESS  2,662,431
BINDER-STRAP JOINT-FORMING TOOL
Filed July 7, 1949  2 Sheets-Sheet 1
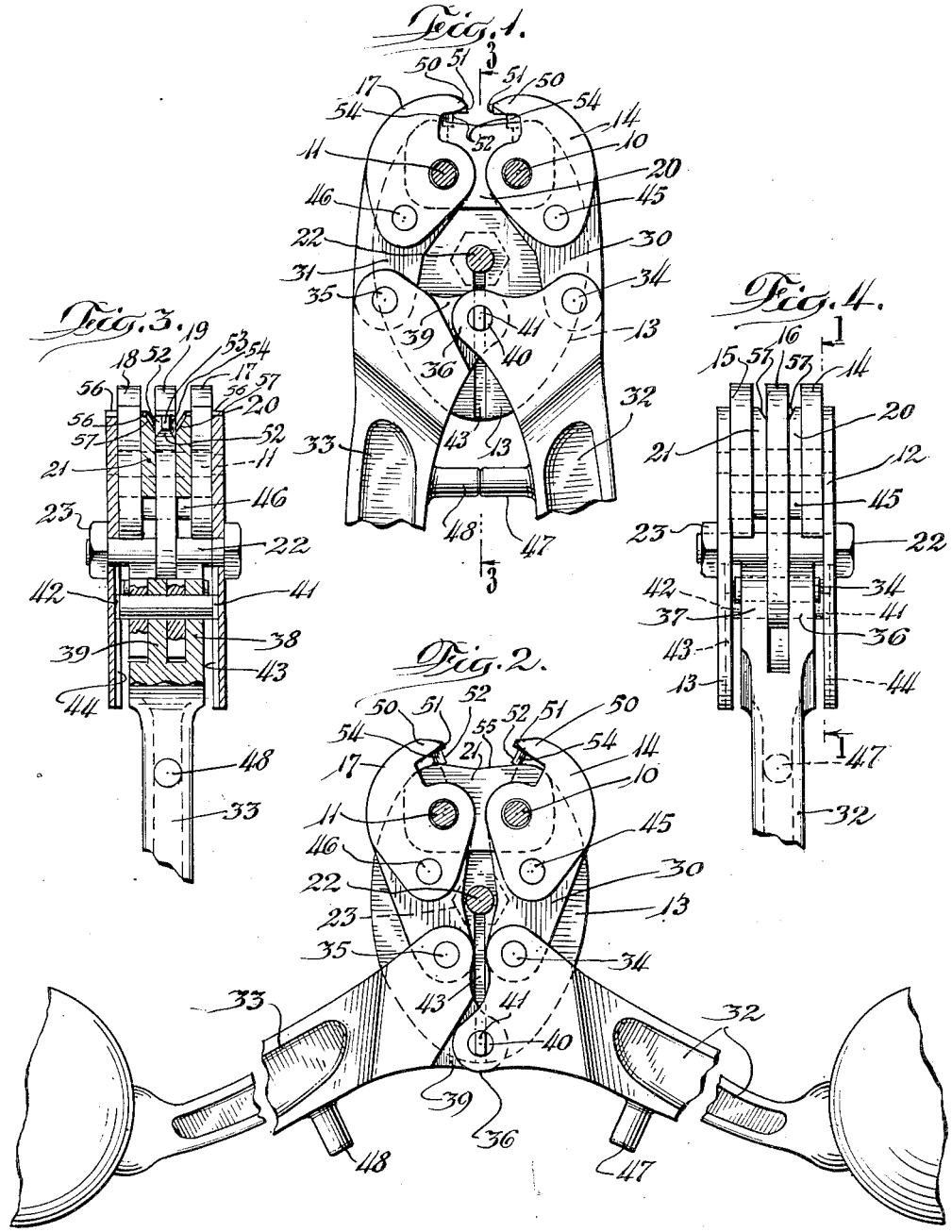
Inventor:
William C. Childress
By Hinkle, Horton, Ahlberg, Hansmann & Kipper
Attorneys.

Dec. 15, 1953   W. C. CHILDRESS   2,662,431
BINDER-STRAP JOINT-FORMING TOOL
Filed July 7, 1949   2 Sheets-Sheet 2
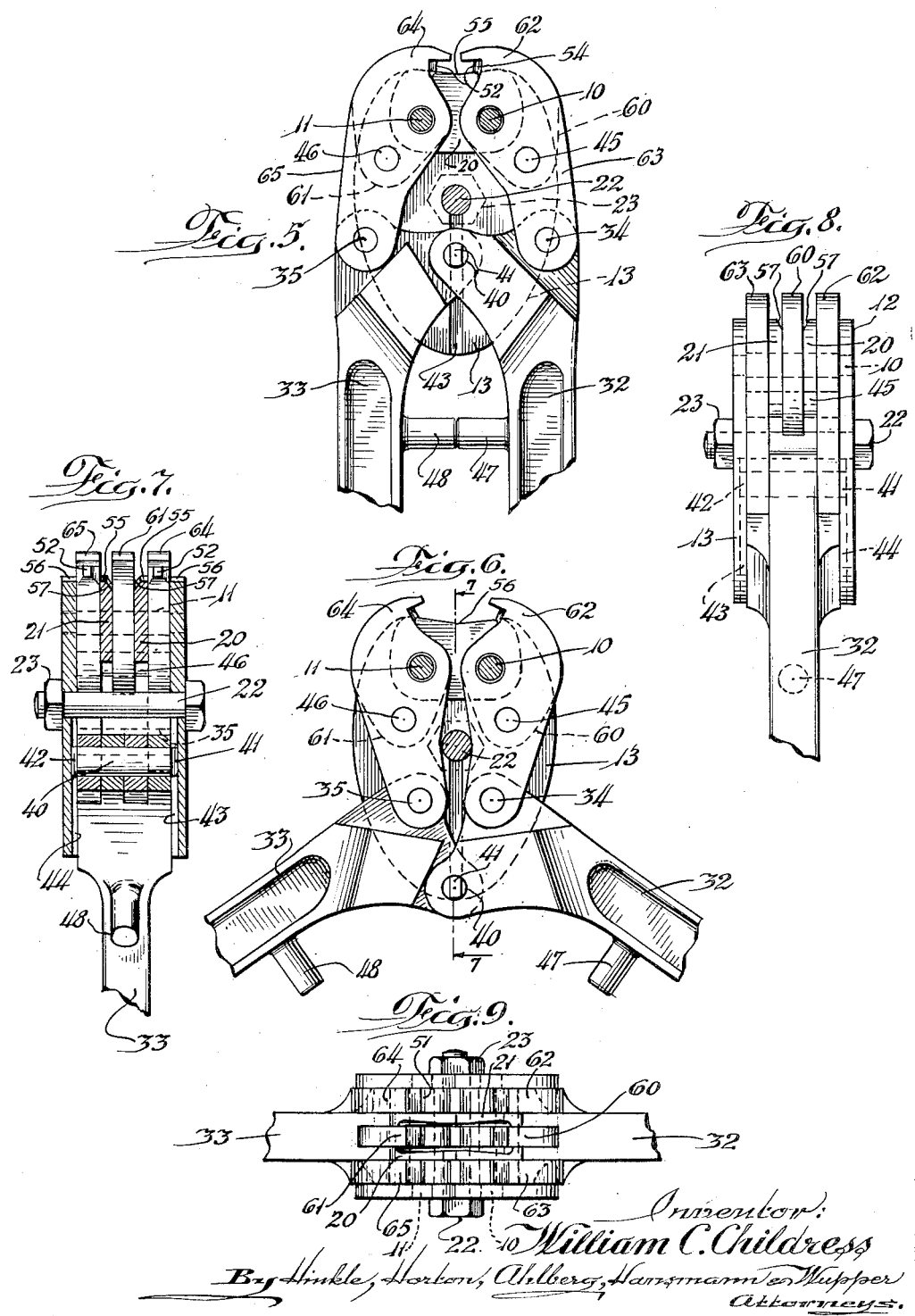

Patented Dec. 15, 1953

2,662,431

UNITED STATES PATENT OFFICE 2,662,431

BINDER-STRAP JOINT-FORMING TOOL

William C. Childress, Oak Park, Ill., assignor to Signode Steel Strapping Company, Chicago, Ill., a corporation of Delaware Application July 7, 1949, Serial No. 103,364

6 Claims. (Cl. 81—9.1)

My invention relates to binder-strap joint-forming tools—tools which in the art are commonly called sealing tools. It has to do particularly with sealing tools of the manual or hand operated variety.

The purpose of the tool is to unite overlapping portions of steel binder strapping and a sleeve-like seal into a tension resisting joint preventing the strap portions from separating so that the strapping may effectively serve to encircle boxes and bundles of various sorts for binding and reinforcing them and to secure loads or load units in carriers such as railway cars. Such seals may be either of the so-called "thread-on" type exemplified by E. E. Flora Patent No. 1,252,680 or of the lateral application or so-called "snap-on" type exemplified by J. W. Leslie Patent No. 1,445,330. The joint is of the type referred to as a crimped joint because separation is resisted by interlocking deformations in the overlapping strap portions and seal produced by localized edgewise crimping.

The principal object of the invention is to provide a tool which will produce a strong joint—one approaching the strength of the strapping—with less work, and consequently less effort on the part of the operator.

Another object is to provide a tool wherein the work necessary to produce a strong joint of the crimp type may be applied with shorter handles than tools have heretofore had, and consequently the operator's effort required is exerted more effectively and easily.

Another object is to provide a tool requiring, on the part of the operator, less effort in the final stages of joint completion than in the initial stages.

A further object is to provide an effective tool that is simple in construction and handier and faster in operation.

Another object is to provide a tool that may be easily rearranged to produce joints having either one or two sets or pair of crimps.

Other objects and advantages will hereinafter appear.

In general the principal objects of my invention are attained by making the complementary edge crimps in the overlapping strapping and seal more abrupt—more nearly at right angles to the direction of the tensional strain—with the result that less displacement toward the center line of the strapping is required and the tendency of the strapping and seal to hump outwardly because of the edgewise crimping pressure—a tendency which has heretofore been resisted by an anvil—is reduced. The tool for producing such crimps has complementary opposing sets of separate seal holding and seal and strap edgewise-crimping jaws which are operatively linked to a pair of handles so that the leverage becomes more effective as the handles and jaws close and which are retained in spaced relationship by side and intermediate plates which support the jaw pivots and assist in making the deformations more abrupt and longitudinally shorter.

Embodiments of my invention incorporated in tools for producing single pair and double pair crimped joints are illustrated in the accompanying drawings wherein:

Fig. 1 is a side elevation of a single-joint tool with a side plate removed and the jaws and handles in closed or joint completion condition;

Fig. 2 is a similar view with the handles and jaws in open condition for application to the overlapping strap ends and seal;

Fig. 3 is a section on the line 3—3 of Fig. 1;

Fig. 4 is an end elevation of a single-joint tool with the jaws closed;

Fig. 5 is a side elevation of a double or tandem joint tool with a side plate removed and jaws closed;

Fig. 6 is a view similar to Fig. 5 with the jaws open;

Fig. 7 is a section on the line 7—7 of Fig. 6;

Fig. 8 is an end elevation of a double-joint tool; and

Fig. 9 is a front elevation of a double joint tool with the jaws open.

Referring first to Figs. 1 to 4, the single-joint (one crimp in each edge) tool has two sets of jaws pivoted upon two fixed pivot pins 10 and 11 which bridge between and are held by side plates 12 and 13. The set of jaws pivoted on pin 10 consists of two holding jaws 14 and 15 and a crimping jaw 16 between them. The other set of jaws pivoted on pin 11 consists likewise of two holding jaws 17 and 18 with a crimping jaw 19 interposed between them. The holding jaws are held in spaced flanking relation to the associated interposed crimping jaws by a pair of thin spacing and limit plates 20 and 21 which bridge between and are held by pivot pins 10 and 11. The side plates, the jaws and their pivot pins and the two limit plates 20—21 are held together by a bolt 22 and a nut 23. As shown most clearly in Figs. 3 and 4, the two ends of pivot pins 10 and 11 are of reduced diameter relative to their central regions to form shoulders accurately to space the side plates and to prevent the bolt nut from being drawn up so tight as to cause binding of the moving parts; and they lend rigidity to the entire head structure of the tool. The two crimping jaws 16 and 19 have rearwardly extending lever arms 30 and 31 which at their outer ends are pivotally connected to operating handles 32 and 33, respectively, by pivot pins 34 and 35. The inner end of handle 32 is formed with a pair of parallel spaced inwardly extending projections 36 and 37 which intermesh with a pair of similar projections 38 and 39 formed on the inner end of handle 33. A connecting pivot and guide pin 40 passes through and pivotally joins the intermeshing handle projections 36—37 and 38—39. Opposite ends of guide pin 40 are reduced to form flattened keys 41 and 42 which slidingly fit into straight slots or keyways 43 and 44 cut in the inner sides of side plates 12 and 13 respectively. These guideway slots lie in the median plane of the tool head perpendicular to the plane of the strapping to be joined. The handle may be provided with confronting stop lugs 47 and 48 which come together as shown in Fig. 1 to prevent further closing movement when the tool jaws have been brought sufficiently together to complete a joint.

The holding jaws 14 and 15 on one side of the tool are caused to move with the corresponding crimping jaw 16 of that set of jaws by a linking pin 45 which passes through rear extensions of the holding jaws and through the lever arm 30 of sealing jaw 16 intermediate the fixed pivot 10 and the pivot pin 34 which joins the holding jaw to handle 32. Similarly holding jaws 17 and 18 are pivotally connected to the companion sealing jaw 19 of the opposite set by a linking pin 46. The two side plates 12 and 13 serve to retain all of the pivot and linking pins in place. By comparison of Fig. 1 showing the handles and jaws closed at joint completion and Fig. 2 showing the handles and jaws fully open in tool applying or strap and seal receiving position, it will be observed that the forces imparted by the handles to the rear ends of sealing jaw levers 30 and 31 through pivot pins 34 and 35, respectively, change from angular related thrusts to substantially directly opposing thrusts on a line perpendicular to the travel of the handle joining pivot pin 40. This change in direction of the thrust imparted to the jaws by the operating handles results in the operator's effort becoming more effective as the handles and jaws approach closed or joint completing condition so that less effort is required. As a typical example, with tool handles of from about ten to fourteen inches in length, an operator effort of forty-five pounds required at the beginning of joint formation may be reduced to only twenty pounds at the completion of a satisfactory joint. This reduction in effort in the final stage tends markedly to insure that maximum crimping of seal and overlapping strapping—with maximum joint strength—is effected.

As shown most clearly in Figs. 1 and 2, each holding jaw has a forwardly and inwardly curved or hooked tip 50 and each crimping jaw has a similar jaw tip 51. These jaw tips when the jaws are fully opened, as shown in Fig. 1, are separated sufficiently to enable them to be applied over the overlapping strapping and seal where a joint is to be formed. As the jaws approach each other upon the closing of the tool, these tips move in beneath the strapping and against the curved edges of the seal—first, of course, bending the seal flanges around the edge of and against the inner side of the strapping if the seal is of the snap-on type. The tips 50 of the two sets of holding jaws never approach each other beyond the point where the seal is pushed tightly against the edges of the strapping and there held while the crimping jaws deform the strapping and seal to produce the joint. Each crimping or sealing jaw is of plate form and is provided with a narrow centrally disposed crimping lug 52 which projects inwardly of the jaw recess formed by the curved or hooked tip 51. Each crimping lug 52 has a flat face 53 substantially half the width of the crimping jaw and with beveled sides 54 which diverge from the face to the sides of the jaw plate at substantially thirty degrees (included angle sixty degrees). As the jaws close, these crimping lugs engage the edges of the seal prior to engagement by the holding jaws and, as closing continues, the oppositely disposed crimping lugs 52 crimp sharply inwardly the opposite edges of the seal and the overlapping strapping therewithin.

The outer or face edge 55 of each of the two spacer and limit plates 20—21 is formed on an obtuse V-angle or slope converging to the center line of the tool; and the outer or face edge 56 of each side plate 12—13 is correspondingly shaped, as clearly shown in Figs. 1 and 2. Also the face edge of each limit plate 20—21 is provided with a bevel 57 which is shown most clearly in Fig. 3. For the lighter gauge seals the two limit plates are so placed in the tool that their beveled edges 57 face each other as shown most clearly in Fig. 3. However, with seals of heavier gauge metal these plates may be reversed so that the bevels 57 are next to the holding jaws rather than next to the crimping jaw.

In operation the head of the tool with the jaws open, as shown in Fig. 2, is applied to the overlapping strapping and seal and then the jaws are closed to the position shown in Fig. 1. As the jaws start to close, the tips of the holding and crimping jaws first engage the seal flanges, whether the seal be of the "snap-on" type or the "thread-on" type. Continuation of the closing movement causes the tips of all of the jaws to fold inwardly the flanges of a snap-on seal so as to cause that type of seal substantially to encompass the overlapping strapping, as does a thread-on seal initially. If the seal is of the "thread-on" type the jaws, upon initial engagement therewith, also pinch the bends of the seal tightly against the edges of the strapping. Thus, in producing a joint with either type of seal, the jaw tips of all of the jaws initially insure that the seal flanges tightly engage the edges of the overlapped strapping and the under surface of the inner of the straps. Then the crimping lugs of the crimping jaws begin edgewise to attack and crimp or fold inwardly the seal and the strapping, the holding jaws continuing to retain the seal flanges tightly against the inner surface of the strapping to prevent either the seal flanges or the strapping from bulging outwardly relative to the tool as the crimping proceeds. The inwardly sloping edges of the side plates and of the limit plates assist in properly centering the tool relative to the work; and the latter permit some bulging or humping of the strapping and seal inwardly toward the tool such as the crimping action tends to create but they serve to confine or limit this humping tendency longitudinally. However, in the region or zone where the edgewise crimping is taking place, there is no confinement or restriction upon this humping or bulging tendency although that zone or region is longitudinally defined or limited by the two limit plates. Therefore, with the relatively sharp or narrow crimping lugs, the edges of the overlapping strapping and encompassing seal are very abruptly crimped inwardly toward the center with the result that well defined interlocking shoulders opposing strap separation under tension are produced — shoulders which are so sharply defined and so nearly at right angles to the direction of tension pull that the crimps need not be so deep as has heretofore been necessary in order to afford joint strength greater than heretofore obtainable with crimp type joints. The formation of such abrupt shouldered edge crimps in the overlapping strapping and seal is facilitated by the fact that tendency of the seal and strapping to hump transversely and toward the tool (outwardly relative to the box or bundle) is unopposed except for the narrow edged limit plates at opposite sides of the crimping jaws. The absence of obstruction to humping throughout the width of the crimping jaws also eliminates the opposing thrust heretofore present in tools of the crimp-joint variety thus permitting the metal of the strapping and seal to flow into or form the hump naturally with resultant reduction of the effort required.

The tool may be easily assembled and disassembled; and because the crimping and holding jaws are separate elements, they may be individually replaced should wear or damage require. This is of special importance as to the crimping jaws since the crimping or deforming lugs thereof are most subject to wear and injury. The fact that the holding jaws are interchangeable and that the crimping jaws are likewise interchangeable, and that by mere reversal the limit plates may condition the tool for different gauges of seals, is of importance in production, assembly and stocking of parts.

Figs. 5 to 9 illustrate a tool for making a double or tandem type of joint—a type especially effective where high strap tension is desired or required. The jaws of this tool are made of precisely the same parts as the single-joint tool heretofore described except that the sets are composed of but two center holding jaws 60 and 61, each of which is flanked by two crimping jaws 62—63 and 64—65, respectively. In other words the number and disposition of the holding and crimping jaws is reversed.

Having thus illustrated and explained the nature and a preferred embodiment of my invention, what I claim and desire to secure by United States Letters Patent is as follows:

1. A sealing tool for producing joints between overlapping portions of metallic strapping which are embraced by a metallic seal comprising a pair of spaced parallel side plates, said plates being generally oval in shape with the front ends thereof being slightly concave to form supporting edges for the back of a seal during joint formation, a pair of side by side pivot pins extending between said plates near the front ends thereof and immovable with respect thereto, at least one pair of complementary crimping jaws with one jaw pivoted to each of said pins, at least one pair of complementary holding jaws with one jaw pivoted to each of said pins, additional members immovably mounted on said pivot pins and having forward edges shaped substantially like the edges of said first members and substantially parallel thereto, said additional members being positioned between pairs of crimping and holding jaws to space said pairs and to support the back of the seal adjacent said crimping jaws during joint formation, said plates being formed to provide rearwardly extending guide means on their inner faces, a pair of handles, second pin means pivoting said handles together and guided at its ends for linear movement by said guide means, a third set of pins pivoting said handles to said crimping jaws, means interconnecting said holding and crimping jaws at points spaced from said pivot pins to cause all of said jaws to move together, and a single bolt passing through said plates to secure the aforementioned tool elements together.

2. A sealing tool for producing joints between overlapping portions of metallic strapping which are embraced by a metallic seal comprising a pair of spaced parallel side plates, said plates being generally oval in shape with the front edges thereof being slightly concave to form supporting edges for the back of a seal during joint formation, a pair of side by side pivot pins extending between said plates near the front ends thereof and fixed relative thereto, at least one pair of complementary crimping jaws with one jaw pivoted to each of said pins, at least one pair of complementary holding jaws with one jaw pivoted to each of said pins, there being at least three sets of said jaws with said sets of crimping and holding jaws alternately arranged and the outermost sets disposed against the inner faces of said side plates, additional members immovably mounted on said pivot pins and having their forward edges shaped substantially like the edges of said first members and substantially parallel thereto, said additional members being positioned between pairs of crimping and holding jaws to space said pairs and to support the back of the seal adjacent said crimping jaws during joint formation, said plates being formed to provide rearwardly extending guide means on their inner faces, a pair of handles, second pin means pivoting said handles together and guided at its ends for linear movement by said guide means, a third set of pins pivoting said handles to said crimping jaws, means interconnecting said holding and crimping jaws at points spaced from said pivot pins to cause all of said jaws to move together, and means coacting with said plates to secure the aforementioned tool elements together.

3. A sealing tool for producing joints between overlapping portions of metallic strapping which are embraced by a metallic seal comprising a pair of side plates, said plates being generally oval in shape with the front ends thereof being slightly concave to form supporting edges for the back of a seal during joint formation, a pair of side by side shouldered pivot pins extending between said plates near the front ends thereof with the shoulders of said pins engaging the inner faces of said plates to space the latter and with the ends of said pins extending through said plates so as to be substantially flush at their outer ends with the outer faces of said plates, at least one pair of complementary crimping jaws with one jaw pivoted to each of said pins, at least one pair of complementary holding jaws with one jaw pivoted to each of said pins, additional members for supporting the back of a seal during joint formation and having forward edges shaped substantially like the edges of said first members and substantially parallel thereto, said additional members each having a pair of holes therethrough fitted to both said pivot pins and being positioned between pairs of crimping and holding jaws to space said pairs and to support the back of the seal adjacent said crimping jaws, said plates being formed to provide rearwardly extending grooves in their inner faces, a pair of handles, second pin means pivoting said handles together and guided at its ends for linear movement in said grooves, a third set of pins pivoting said handles to said crimping jaws, a fourth set of pins passed through each set of holding and crimping jaws at points spaced from said pivot pins to cause all of said jaws to move together, all of said pins being substantially normal to the planes of said plates, said plates overlying both ends of the pins of said second pin means and said third and fourth sets in all positions of said handles to confine said last designated pins against longitudinal movement, and a single bolt passing through said plates to secure the aforementioned tool elements together.

4. In a sealing tool for producing a crimped joint between overlapping portions of metallic strapping which are embraced by a metallic seal having a pair of spaced side plates with means for holding the side plates in spaced parallel relationship, a pair of spaced pivot pins held by and bridging between the side plates, a pair of pivotally interconnected operating handles having their inner ends lying between and guided by the side plates, and a pair of complementary holding jaws with one jaw pivotally mounted on each pivot pin and adapted to be be moved inwardly and outwardly with respect to the other jaw, the holding jaws when moved inwardly engaging and holding the overlapping portions of the strapping and embracing seal firmly together, the improvement which comprises a pair of complementary crimping jaw plates pivotally connected to the inner ends of the handles with one crimping jaw plate pivotally mounted on each of the pivot pins, each of said crimping jaw plates having a hooked outer end and a crimping lug formed on an edge of the jaw plate to project therefrom and lying within the recess of the hook, said crimping jaw plates being arranged with the open sides of their ends facing inwardly and said crimping lugs projecting toward each other, said crimping lugs being adapted to engage the edges of the overlapping strapping portions and embracing seal and to edgewise deform them as the hooked ends of said crimping jaw plates are moved inwardly, means spacing said pair of crimping jaw plates and the pair of holding jaws, and a linking connection between each crimping jaw plate and the holding jaw mounted on the same pivot pin so that all of said jaws and plates move inwardly and outwardly together.

5. In a sealing tool for producing a crimped joint between overlapping portions of metallic strapping which are embraced by a metallic seal having a pair of spaced side plates with means for holding the side plates in spaced parallel relationship, a pair of spaced pivot pins held by and bridging between the side plates, a pair of pivotally interconnected operating handles having their inner ends lying between and guided by the side plates, and a pair of complementary holding jaws with one jaw pivotally mounted on each pivot pin and adapted to be moved inwardly and outwardly with respect to the other jaw, the holding jaws when moved inwardly engaging and holding the overlapping portions of the strapping and embracing seal firmly together, the improvement which comprises a pair of complementary crimping jaw plates pivotally connected to the inner ends of the handles with one crimping jaw plate pivotally mounted on each of the pivot pins, each of said crimping jaw plates having a hooked outer end and a crimping lug formed on an edge of the jaw plate to project therefrom and lying within the recess of the hook, said crimping jaw plates being arranged with the open sides of their ends facing inwardly and said crimping lugs projecting toward each other, said crimping lugs being adapted to engage the edges of the overlapping strapping portions and embracing seal and to edgewise deform them as the hooked ends of said crimping jaw plates are moved inwardly, a spacing and limiting plate interposed between the pair of holding jaws and said pair of crimping jaw plates and fixed relative to the pivot pins and adapted to limit the transverse humping of the strapping portions and embracing seal adjacent said crimping jaw plates, and a linking connection between each crimping jaw plate and the holding jaw mounted on the same pivot pin so that all of said jaws and plates move inwardly and outwardly together.

6. In a sealing tool for producing a crimped joint between overlapping portions of metallic strapping which are embraced by a metallic seal having a pair of spaced side plates with means for holding the side plates in spaced parallel relationship, a pair of spaced pivot pins held by and bridging between the side plates, and a pair of pivotally interconnected operating handles having their inner ends lying between and guided by the side plates, the improvement which comprises a pair of complementary holding jaws with one jaw pivotally mounted on each pivot pin and adapted to be moved inwardly and outwardly with respect to the other jaw, said holding jaws being formed at their outer ends with curved tips to engage and hold the overlapping portions of the strapping and embracing seal firmly together when said jaws are moved inwardly, a pair of complementary crimping jaw plates pivotally connected to the inner ends of the handles with one crimping jaw plate pivotally mounted on each of the pivot pins, each of said crimping jaw plates having a hooked outer end and a crimping lug formed on an edge of the jaw plates to project therefrom and lying within the recess of the hook, said crimping jaw plates being arranged with the open sides of their ends facing inwardly and said crimping lugs projecting toward each other, said crimping lugs being adapted to engage the edges of the overlapping strapping portions and embracing seal and to edgewise deform them as the hooked ends of said crimping jaw plates are moved inwardly, and a linking connection between each crimping jaw plate and the holding jaw mounted on the same pivot pin so that all of said jaws and plates move inwardly and outwardly together, said curved tips on said holding jaws and said crimping lugs on said crimping jaw plates lying longitudinally of the tool substantially directly outwardly of said pivot pins at the conclusion of a joint producing operation thereby to produce a movement nearly perpendicular to the longitudinal median axis of the tool when said jaws are moved inwardly and engaged with the overlapping portions of the strapping and embracing seal.

WILLIAM C. CHILDRESS.

References Cited in the file of this patent

UNITED STATES PATENTS

| Number | Name | Date |
|---|---|---|
| 1,252,680 | Flora | Jan. 8, 1918 |
| 1,445,330 | Leslie | Feb. 13, 1923 |
| 1,893,901 | McGregor et al. | Jan. 10, 1933 |
| 1,901,903 | Edwards | Mar. 21, 1933 |
| 1,974,913 | Childress | Sept. 25, 1934 |
| 2,177,536 | Porter | Oct. 24, 1939 |
| 2,315,596 | Childress | Apr. 6, 1943 |
| 2,336,264 | Leslie | Dec. 7, 1943 |
| 2,432,306 | Gerrard et al. | Dec. 9, 1947 |
| 2,456,523 | Mead | Dec. 14, 1948 |